US012294750B2

(12) United States Patent
Kapchits et al.

(10) Patent No.: US 12,294,750 B2
(45) Date of Patent: *May 6, 2025

(54) SELECTIVE STREAMING OF VIDEO SEGMENTS BASED ON BUFFER DATA AND DOWNLOAD RATE RANGE

(71) Applicant: YAHOO ASSETS LLC, New York, NY (US)

(72) Inventors: Boris Kapchits, Yokneam (IL); Ohad Shacham, Kfar Monash (IL)

(73) Assignee: YAHOO ASSETS LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,016

(22) Filed: Apr. 3, 2023

(65) Prior Publication Data

US 2023/0300391 A1    Sep. 21, 2023

Related U.S. Application Data

(63) Continuation of application No. 16/225,194, filed on Dec. 19, 2018, now Pat. No. 11,622,140.

(51) Int. Cl.
  *H04N 21/24*      (2011.01)
  *H04L 65/75*      (2022.01)
  *H04N 21/2343*    (2011.01)

(52) U.S. Cl.
  CPC ....... *H04N 21/2402* (2013.01); *H04L 65/764* (2022.05); *H04N 21/234363* (2013.01); *H04N 21/2401* (2013.01)

(58) Field of Classification Search
  CPC ......... H04N 21/8456; H04N 21/23418; H04N 21/234363; H04N 21/6373; H04N 21/64738; H04N 21/23439; H04L 65/752
  See application file for complete search history.

(56) References Cited

U.S. PATENT DOCUMENTS

| | | | |
|---|---|---|---|
| 6,256,309 B1 | 7/2001 | Daley et al. | |
| 8,997,160 B2 * | 3/2015 | Hunt | ................... H04N 21/6377 725/86 |
| 10,116,715 B2 | 10/2018 | Rodbro et al. | |
| 10,244,270 B2 * | 3/2019 | Behbahani | ....... H04N 21/26258 |
| 2005/0100100 A1 * | 5/2005 | Unger | ................ H04N 21/6373 375/E7.134 |

(Continued)

*Primary Examiner* — Mahran Y Abu Roumi
(74) *Attorney, Agent, or Firm* — James J. DeCarlo; Greenberg Traurig, LLP

(57) ABSTRACT

Technologies for selectively streaming video based on mapping buffer data to download rates. The technologies can include sampling download rates of a video player prior to or during downloading of a first video segment to the video player. The technologies can include determining a range of download rates of the video player based at least on the sampled download rates. The technologies can include determining an amount of accumulated video data in a buffer of the video player immediately prior to or during the downloading of the first video segment. Also, the technologies can include mapping the determined amount of accumulated video data to a download rate within the determined range of download rates using a mapping function, and determining a second video segment quality for a second video segment based at least on the mapped download rate.

20 Claims, 6 Drawing Sheets

(56) References Cited

U.S. PATENT DOCUMENTS

| | | |
|---|---|---|
| 2013/0232228 A1* | 9/2013 | Ramamurthy ..... H04N 21/4424 |
| | | 709/219 |
| 2014/0089469 A1* | 3/2014 | Ramamurthy ........ H04L 65/613 |
| | | 709/219 |
| 2014/0273990 A1 | 9/2014 | Rodbro et al. |
| 2016/0080457 A1* | 3/2016 | Perry .................... H04N 19/46 |
| | | 709/219 |
| 2016/0277468 A1* | 9/2016 | Rödbro .................. H04L 65/80 |
| 2018/0242002 A1* | 8/2018 | Katsavounidis ..... H04N 19/172 |
| 2018/0248806 A1* | 8/2018 | Burnley ................ H04L 1/0002 |
| 2020/0037015 A1* | 1/2020 | Mahvash ......... H04N 21/44209 |
| 2020/0128255 A1* | 4/2020 | Halepovic ............ H04N 19/176 |

* cited by examiner

SELECTIVE STREAMING OF VIDEO SEGMENTS BASED ON BUFFER DATA AND DOWNLOAD RATE RANGE

CROSS REFERENCE TO RELATED APPLICATIONS

This application is a continuation of, and claims priority from, co-pending U.S. patent application Ser. No. 16/225,194, filed Dec. 19, 2018, entitled SELECTIVE STREAMING OF VIDEO SEGMENTS BASED ON BUFFER DATA AND DOWNLOAD RATE RANGE, the contents of which are hereby incorporated by reference.

COPYRIGHT PROTECTION

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates to selectively streaming video based on buffer data and download rates. Also, the present disclosure relates to range based adaptive bitrate processes for selective streaming of digital video segments.

BACKGROUND

Adaptive bitrate and bandwidth estimator processes can be advantageously used with digital video players that stream video segments. Such processes can be used for choosing future video segment qualities in a video stream. Adaptive bitrate processes typically make decisions based on an amount of accumulated video data in an internal buffer of a video player and a bandwidth estimation supplied by a bandwidth estimator process. Typically, bandwidth estimator processes return an estimation of bandwidth as a single number that is determined using some function applied on bandwidth samples usually collected over a few minutes before selection of a next video segment quality. This can be useful to the playing of streaming video since an output of such a function can be used as input for the video player to adapt to changes in network bandwidth. And, the adaptations can improve the experience of viewing streaming video by reducing rebuffering delays and unnecessary drops in video segment quality or pixel resolution.

However, the bandwidth of a network can vary significantly over time; hence, the single number approach, used by conventional adaptive bitrate and bandwidth estimator processes, may not give an adequate identification of past and current network behavior. Therefore, digital video players relying on such conventional adaptive bitrate and bandwidth estimator processes may have more rebuffering delays and unnecessary drops in video segment quality or pixel resolution than desired. With the bandwidth estimation processes and heuristic techniques currently used, there is no good way to distinguish between stable and unstable networks that have about the same average bandwidth. However, while for the stable networks the average bandwidth is a good estimation for the immediate future behavior, for an unstable network the actual bandwidth can be significantly higher or significantly lower than the estimation of bandwidth from conventional adaptive bitrate and bandwidth estimator processes. Thus, leading the adaptive bitrate and bandwidth estimator processes to bad decisions in selecting next or, more generally speaking, future video segment quality.

One known improved solution is disclosed in U.S. Pat. No. 10,116,715, issued on Oct. 30, 2018 and titled "Adapting Encoded Bandwidth", which discloses percentiles of bandwidth history and using the percentiles to define a range of bandwidth to operate in. The aforesaid techniques described in U.S. Pat. No. 10,116,715 consider bandwidth minimum floor and maximum cap as well as recency to estimate bandwidth. This may improve the aforementioned conventional techniques, but there still remain technical problems associated with adaptive bitrate and bandwidth estimator processes.

SUMMARY

Factoring in video player buffer use information and accumulated data in the buffer can improve adaptive bitrate and bandwidth estimator processes. Such additional factors are not considered by U.S. Pat. No. 10,116,715 and present a technical deficiency in the art. Described herein are improved systems and methods for selectively streaming video that can overcome at least the technical problems mentioned in the background section above. The systems and methods for selectively streaming video are based on buffer data and download rates as well as improved range based adaptive bitrate processes for selectively streaming digital video. The improved range based adaptive bitrate processes leverage mapping buffer data with ranges of download rates to choose future video segment quality (such as to choose next video segment quality). In summary, examples of the systems and methods disclosed herein for selectively streaming video provide specific technical solutions to at least the technical problems mentioned in the background section and other parts of the application as well as other technical problems not described herein but recognized by those of skill in the art.

In general, embodiments disclosed herein can overcome such technical problems using at least a combined technical solution of: (1) using range based adaptive bitrate processes to determine a bandwidth range, and (2) mapping buffer data to a download rate within the determined bandwidth range using a mapping function. With the technical solution herein, choosing future video segment quality, such as next video segment quality, becomes more reliable in that, for example, the selection of the video segment quality is based on the mapped download rate and therefore based on a range of download rates instead of a single averaged value—which is the case for conventional techniques.

The new and improved solution considers the aberrations of network bandwidth. In some embodiments, instead of using known types of bandwidth estimation or averaging, the new and useful technologies use accumulated statistical data on network bandwidth. This includes considering the aberrations in the bandwidth. The techniques can also include calculating percentiles over download rate samples. The calculated percentiles can then be used instead of a single estimated or averaged download rate to select a future video segment quality. In addition, the technologies can choose bitrate by mapping the buffer state to the range instead of mapping to a discrete bitrate. And, from the range, a corresponding bitrate can be selected for mapping to a video segment quality.

In short, the methods and systems described herein use a range of numbers rather than a single number because it has been found that a range of values can give a better classification of a network's bandwidth (with its aberrations) than a single number. Indeed, for two networks with the same average bandwidth, the more fluctuating and unstable network produces wider range of bandwidth. Fortunately, the technical solutions described herein can make more intelligent adaptations for the less stable network.

Additionally, history of samples of download rates for a video player or related device can be stored and used to make the determinations of download rate range. Also, the stored download rate samples can be used to calculate percentiles for those samples. And, then the percentiles can be used as input to define a range of download rates for the mapping functionality. To put it another way, the percentiles can be used as a basis for the defined range that can serve as an input for an adaptive bitrate process, which, in turn, choses a download rate value within the range based on internal buffer occupancy of the video player mapped to the range. The download rate chosen from the range can then be mapped to a video segment quality. Also, additional parameters can be used to further refine the selection of the future video segment quality. Thus, the systems and methods provide a novel and technical way of using download rate statistical data, which can include bandwidth aberrations, to establish the range of possible bandwidth values and to map the player buffer occupancy to a value in the range; and, in turn, choose the video segment quality according to the value in the range.

In accordance with one or more embodiments, this disclosure provides computerized methods for selectively streaming digital video, as well as a non-transitory computer-readable storage medium for carrying out technical steps of the computerized methods. The non-transitory computer-readable storage medium has tangibly stored thereon, or tangibly encoded thereon, computer readable instructions that when executed by one or more devices (e.g., application server, transactions server, client device, and the like) cause at least one processor to perform a method for a novel and improved selective streaming of digital video.

In accordance with one or more embodiments, a system is provided that includes one or more computing devices configured to provide functionality in accordance with one or more embodiments of a novel and improved way of selectively streaming digital video.

In accordance with one or more embodiments, functionality is embodied in steps of a method performed by at least one computing device. In accordance with one or more embodiments, program code (or program logic) executed by processor(s) of a computing device to implement functionality in accordance with one or more embodiments described herein is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

Figure 1:
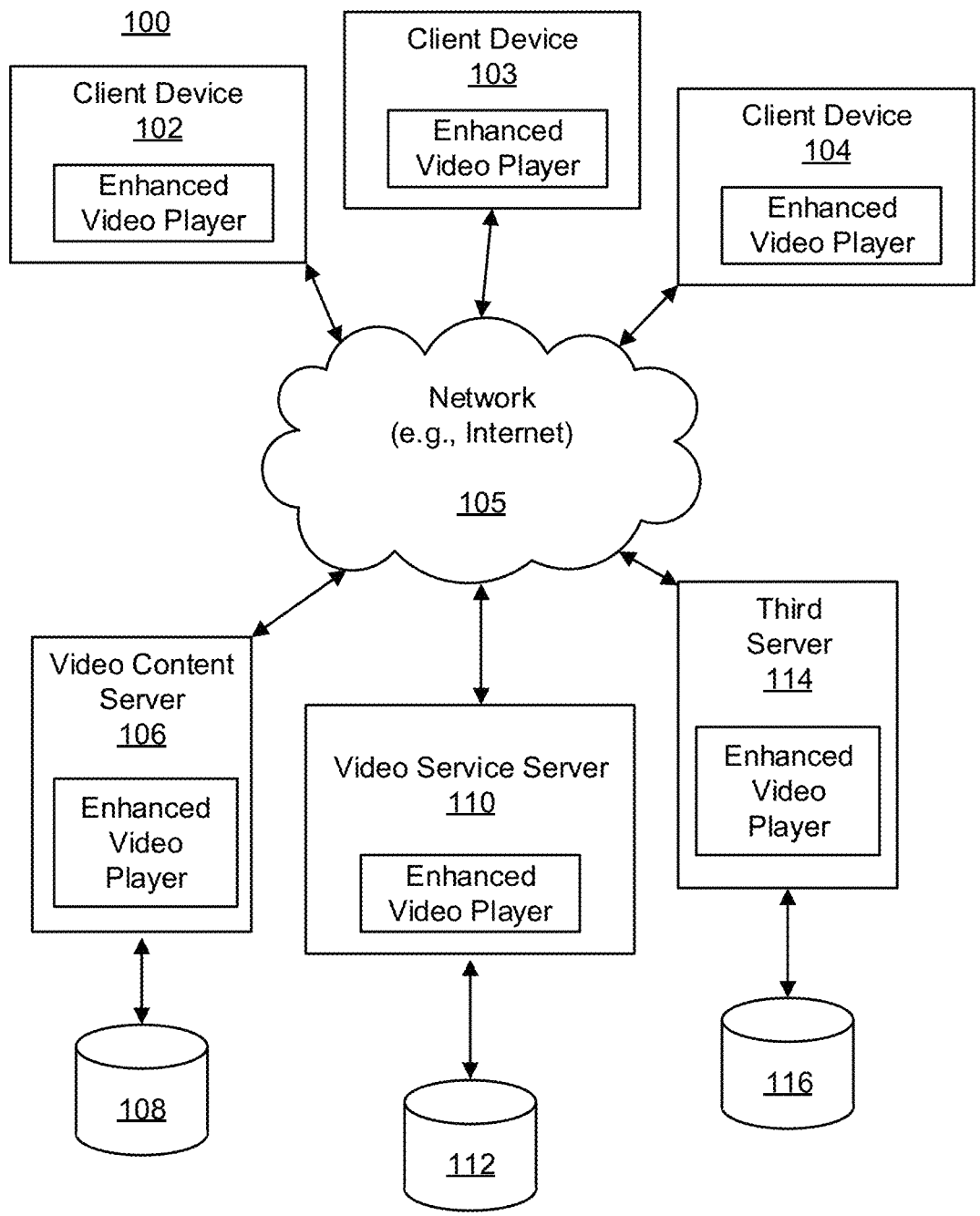
FIG. 1 is a schematic diagram illustrating an example of a network (which includes elements that can implement selectively streaming video based on buffer data and download rates) within which systems and methods disclosed herein can be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium can include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers can vary widely in configuration or capabilities, but generally a server can include one or more central processing units and memory. A server can also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that can couple devices so that communications can be exchanged, such as between a server and a client device or other types of devices, including between wireless devices coupled via a wireless network, for example. A network can also include mass storage, such as network attached storage (NAS), a storage area network (SAN), or other forms of computer or machine-readable media, for example. A network can include the Internet, one or more local area networks (LANs), one or more wide area networks (WANs), wire-line type connections, wireless type connections, cellular or any combination thereof. Likewise, sub-networks, which can employ differing architectures or can be compliant or compatible with differing protocols, can interoperate within a larger network. Various types of devices can, for example, be made available to provide an interoperable capability for differing architectures or protocols. As one illustrative example, a router can provide a link between otherwise separate and independent LANs.

A communication link or channel can include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as can be known to those skilled in the art. Furthermore, a computing device or other related electronic devices can be remotely coupled to a network, such as via a wired or wireless line or link, for example.

A computing device can be capable of sending or receiving signals, such as via a wired or wireless network, or can be capable of processing or storing signals, such as in memory as physical memory states, and can, therefore, operate as a server. Thus, devices capable of operating as a server can include, as examples, dedicated rack mounted servers, desktop computers, laptop computers, set top boxes, integrated devices combining various features, such as two or more features of the foregoing devices, or the like. Servers can vary widely in configuration or capabilities, but generally a server can include one or more central processing units and memory. A server can also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device can include a computing device capable of sending or receiving signals, such as via a wired or a wireless network. A client device can, for example, include a desktop computer or a portable device, such as a cellular telephone, a smart phone, a display pager, a radio frequency (RF) device, an infrared (IR) device, an NFC device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device can vary in terms of capabilities or features. Claimed subject matter is intended to cover a wide range of potential variations. For example, a simple smart phone, phablet or tablet can include a numeric keypad or a display of limited functionality, such as a monochrome liquid crystal display (LCD) for displaying text. In contrast, however, as another example, a web-enabled client device can include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device can include or can execute a variety of operating systems, including a personal computer operating system, such as a Windows, iOS or Linux, or a mobile operating system, such as iOS, Android, or Windows Mobile, or the like.

A client device can include or can execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device can also include or execute an application to communicate content, such as, for example, textual content, multimedia content, or the like. A client device can also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

In general, embodiments disclosed herein can overcome technical problems associated with streaming video segments using a combined technical solution of: (1) using range based adaptive bitrate processes, and (2) mapping buffer data to a download rate within a determined range of download rates using a mapping function. With the technical solution, choosing next or future video segment quality for a next or future video segment to be downloaded becomes more reliable in that for example the selection of the video segment quality is based on the mapped download rate and therefore based on a range of download rates instead of a single estimated or average rate. The technical solution considers the aberrations of network bandwidth.

The systems and methods disclosed herein can rely on a ranged based adaptive bitrate process and/or a range based bandwidth estimator process, rather than calculating a single number as a bandwidth estimation. Assuming that future network behavior does not differ much from the immediate past, the range describes the network conditions much better than the single estimated number which is the output of conventional adaptive bitrate and bandwidth estimator processes. In addition to the range based techniques, the systems and method can map the player buffer state to the range and choose the bitrate according to the results of the mapping. The decisions of an adaptive bitrate process that uses a range of values and the aforesaid mapping can achieve much more effective selective streaming of digital video. Also, such techniques can choose to stay on the safe side, going to the lower end of the range if the video buffer is empty, or to the higher end, if the buffer is full and the adaptive bitrate is set for higher risk, but still staying in the range of the usual network performance. Without using a range as input for the mapping, the adaptive bitrate can fall into unnecessary extremities, falling to a lowest bitrate available when the buffer is empty or jumping to a too high bitrate when the buffer is almost full.

The systems and methods can include sampling download rates of a video player prior to or during downloading of a first video segment (e.g., a current video segment) to the video player. The systems and methods can also include determining a range of download rates of the video player based at least on the sampled download rates. The technologies can include determining an amount of accumulated video data in a buffer of the video player immediately prior to or during the downloading of the first video segment. Also, the technologies can include mapping the amount of accumulated video data to a download rate within the determined range of download rates using a mapping function. And, the methods and systems can finally include determining a second video segment quality (e.g., a next video segment quality or another future video segment quality) for a second video segment (e.g., a next video segment or another future video segment) to be downloaded after the downloading of the first video segment based at least on the mapped download rate.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein can be practiced. Not all the components can be required to practice the disclosure, and variations in the arrangement and type of the components can be made without departing from the spirit or scope of the disclosure. As shown, system 100 of FIG. 1 includes local area networks ("LANs")/wide area networks ("WANs")— network 105 and client devices 102-104 (e.g., such as handheld or mobile devices, Internet of Things devices, etc.). Streaming video segments can be downloaded over network 105 by client devices (such as client devices 102-104) for digital video players stored and executed on the devices (such as the enhanced digital video player described herein).

As shown, system 100 of FIG. 1 also includes video content server 106 communicatively coupled to database 108 used by the content server, and video service server 110 that can persistently store the enhanced video player described herein and can provide the enhanced video player to other computing devices for being stored in memory of those devices or persistently stored in those devices. Also, as shown, system 100 of FIG. 1 includes database 112 communicatively coupled to video service server 110 and used by the video service server, and a third server 114 communicatively coupled to database 116 use by the third server. The databases described herein can be used by the servers to select, store and organize data used as input for the processes described herein. The client devices described herein can also select and use the data stored and organized in the databases as input for the processes described herein.

It is to be understood that the processes described herein can be executed by one or more of the client devices and servers disclosed herein. Specifically, for example, each of the servers 106, 110, and 114 can include a device that includes a configuration to perform at least some of the operations of process 300 depicted in FIG. 3 and alternative sub-processes of process 300 illustrated in FIGS. 4 and 5. Also, for example, each of the client devices 102-104 can include a device that includes a configuration to perform at least some of the operations of process 300 depicted in FIG. 3 and alternative sub-processes of process 300 illustrated in FIGS. 4 and 5. Example embodiments of client devices 102-104 and servers 106, 110, and 114 are described in more detail below.

Generally, client devices 102-104 can include virtually any computing device capable of receiving and sending a message over a network, such as network 105—which could include a wireless network—, or the like. Client devices 102-104 can also be mobile devices that are configured to be portable and held in a hand or two hands. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices typically range widely in terms of capabilities and features. For example, a cell phone can have a numeric keypad and a few lines of monochrome LCD display on which only text can be displayed. In another example, a web-enabled mobile device can have a touch sensitive screen, a stylus, and an HD display in which both text and graphics can be displayed.

A web-enabled client device can include a browser application that is configured to receive and to send web pages, web-based messages, and the like. The browser application can be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Client devices 102-104 and the servers 106, 110, and 114 can each include at least one client application that is configured to receive content or data from another computing device. The client application can include a capability to provide and receive textual content, graphical content, audio content, authentication and keying information, and the like. The client application can further provide information that identifies itself, including a type, capability, name, and the like. In one embodiment, client devices 102-104 and the servers 106, 110, and 114 can each uniquely identify themselves through any of a variety of mechanisms. Client devices can be identifiable via a phone number, Mobile Identification Number (MIN), an electronic serial number (ESN), or another type of device identifier. Servers can be identifiable via an electronic serial number (ESN) or another type of device identifier.

In general, client devices 102-104 and servers 106, 110, and 114 can be capable of sending or receiving signals, such as via a wired or wireless network, or can be capable of processing or storing signals, such as in memory as physical memory states.

Network 105 is configured to couple devices 102-104 and servers 106, 110, and 114, or the like, with other computing devices. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, can be compatible with or compliant with one or more protocols. Signaling formats or protocols employed can include, for example, TCP/IP, UDP, QUIC (Quick UDP Internet Connection), DECnet, NetBEUI, IPX, APPLETALK™, or the like. Versions of the Internet Protocol (IP) can include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets can be communicated between nodes of a network, such as, for example, to one or more sites employing a local network address. A signal packet can, for example, be communicated over the Internet from a user site via an access node coupled to the Internet. Likewise, a signal packet can be forwarded via network nodes to a target site coupled to the network via a network access node, for example. A signal packet communicated via the Internet can, for example, be routed via a path of gateways, servers, etc. that can route the signal packet in accordance with a target address and availability of a network path to the target address.

In some embodiments, the network 105 can include content distribution network(s) and/or application distribution network(s). A content distribution network (CDN) or an application distribution network (ADN) generally refers to a delivery system that includes a collection of computers or computing devices linked by a network or networks. A CDN or ADN can employ software, systems, protocols or techniques to facilitate various services, such as storage, caching, communication of content, or streaming media or applications. A CDN or ADN can also enable an entity to operate or manage another's site infrastructure, in whole or in part.

The servers 106, 110, and 114 can include a device that includes a configuration to provide content such as interactive content via a network to another device. Such server(s) can, for example, host a site, service or an associated application, such as, an email platform (e.g., Yahoo!® Mail), a social networking site, a photo sharing site/service (e.g., Tumblr®), a search platform or site, or a personal user site (such as a blog, vlog, online dating site, and the like) and the like. Such server(s) can also host a variety of other sites, including, but not limited to business sites, educational sites, dictionary sites, encyclopedia sites, wikis, financial sites, government sites, and the like. Devices that can operate as such server(s) include personal computers desktop computers, multiprocessor systems, microprocessor-based or programmable consumer electronics, network PCs, servers, and the like.

The servers 106, 110, and 114 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a mail application and/or email-platform, can be provided via the application server 108, whereby a user is able to utilize such service upon the user being authenticated, verified or identified by the service. Examples of content can include videos, text, audio, images, or the like, which can be processed in the form of physical signals, such as electrical signals, for example, or can be stored in memory, as physical states, for example.

Also, servers 106, 110, and 114 can include an ad server such as a server that stores online advertisements for presentation to users. "Ad serving" provided by an ad server refers to methods used to place online advertisements on websites, in applications, or other places where users are more likely to see them, such as during an online session or during computing platform use, for example. Various monetization techniques or models can be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high-quality ad placement offers ad platforms competitive advantages. Thus, higher speeds and more relevant context detection improve these technological fields.

Servers 106, 110, and 114 can be capable of sending or receiving signals, such as via a wired or wireless network, or can be capable of processing or storing signals, such as in memory as physical memory states. Devices capable of operating as a server can include, as examples, dedicated rack-mounted servers, desktop computers, laptop computers, set top boxes, integrated devices combining various features, such as two or more features of the foregoing devices, or the like. Servers can vary widely in configuration or capabilities, but generally, a server can include one or more central processing units and memory. A server can also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 110, and 114. This can include in a non-limiting example, authentication servers, search servers, email servers, social networking services servers, SMS servers, IM servers, MMS servers, exchange servers, photo-sharing services servers, and travel services servers, via the network 105 using their various client devices. In some embodiments, applications, such as a mail or messaging application (e.g., Yahoo!® Mail, Yahoo!® Messenger), a photo sharing/user-generated content (UGC) application (e.g., Flickr®, Tumblr®, and the like), a streaming video application (e.g., Netflix®, Hulu®, iTunes®, Amazon Prime®, HBO Go®, and the like), blog, photo or social networking application (e.g., Facebook®, Twitter® and the like), search application (e.g., Yahoo!® Search), and the like, can be hosted by servers 106, 110, and 114. Thus, servers 106, 110, and 114 can store various types of applications and application related information including application data and user profile information (e.g., identifying and behavioral information associated with a user). It should also be understood that servers 106, 110, and 114 can also store various types of data related to content and services provided by an associated database. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 110, and 114.

Moreover, although FIG. 1 illustrates servers 106, 110, and 114 as single computing devices, respectively, the disclosure is not so limited. For example, one or more functions of servers 106, 110, and 114 can be distributed across one or more distinct computing devices. Moreover, in one embodiment, servers 106, 110, and 114 can be integrated into a single computing device, without departing from the scope of the present disclosure.

Figure 2:
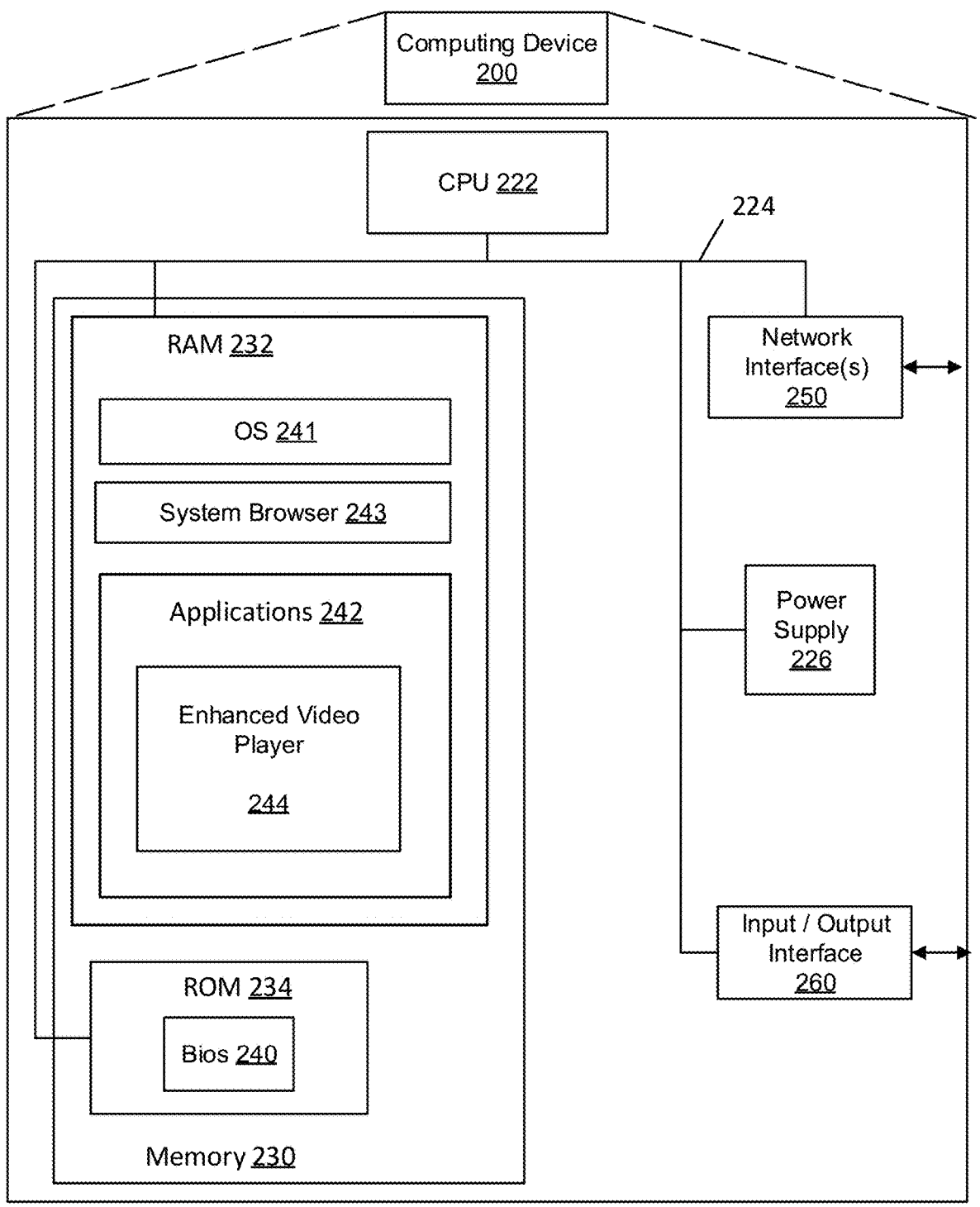
FIG. 2 is a schematic diagram illustrating an example of a computing device, in accordance with some embodiments of the present disclosure.

FIG. 2 is a schematic diagram illustrating a computing device 200 showing an example embodiment of a computing device that can be used within the present disclosure. The computing device 200 can include many more or less components than those shown in FIG. 2. However, the components shown are sufficient to disclose an illustrative embodiment for implementing some aspects the present disclosure. The computing device can represent, for example, any one or more of the servers or client devices discussed above in relation to FIG. 1.

As shown in the figure, computing device 200 includes a processing unit (CPU) 222 in communication with a mass memory 230 via a bus 224. Computing device 200 also includes a power supply 226, one or more network interfaces 250, and an input/output interface 260 (which can include an audio interface, a display, a keypad, an illuminator, a global positioning systems (GPS) receiver, sensors, and an input/output interface to such devices).

Power supply 226 provides power to computing device 200. A rechargeable or non-rechargeable battery can be used to provide power. The power can also be provided by an external power source, such as an AC adapter or a powered docking cradle that supplements and/or recharges a battery. Computing device 200 can optionally communicate with a base station (not shown), or directly with another computing device. Network interface 250 includes circuitry for coupling computing device 200 to one or more networks, and is constructed for use with one or more communication protocols and technologies as discussed above. Network interface 250 is sometimes known as a transceiver, transceiving device, or network interface card (NIC). The input/output interface 260 can be used for communicating with external devices. Input/output interface 260 can utilize one or more communication technologies, such as USB, infrared, Bluetooth™, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of computing device 200. The mass memory also stores an operating system 241 in RAM 232 for controlling the operation of computing device 200. It will be appreciated that this component can include a general-purpose operating system such as a version of UNIX, or LINUX™, or a specialized client communication operating system such as Windows Client™, or the Symbian® operating system. The operating system can include, or interface with a Java virtual machine module that enables control of hardware components and/or operating system operations via Java application programs.

Figure 3:
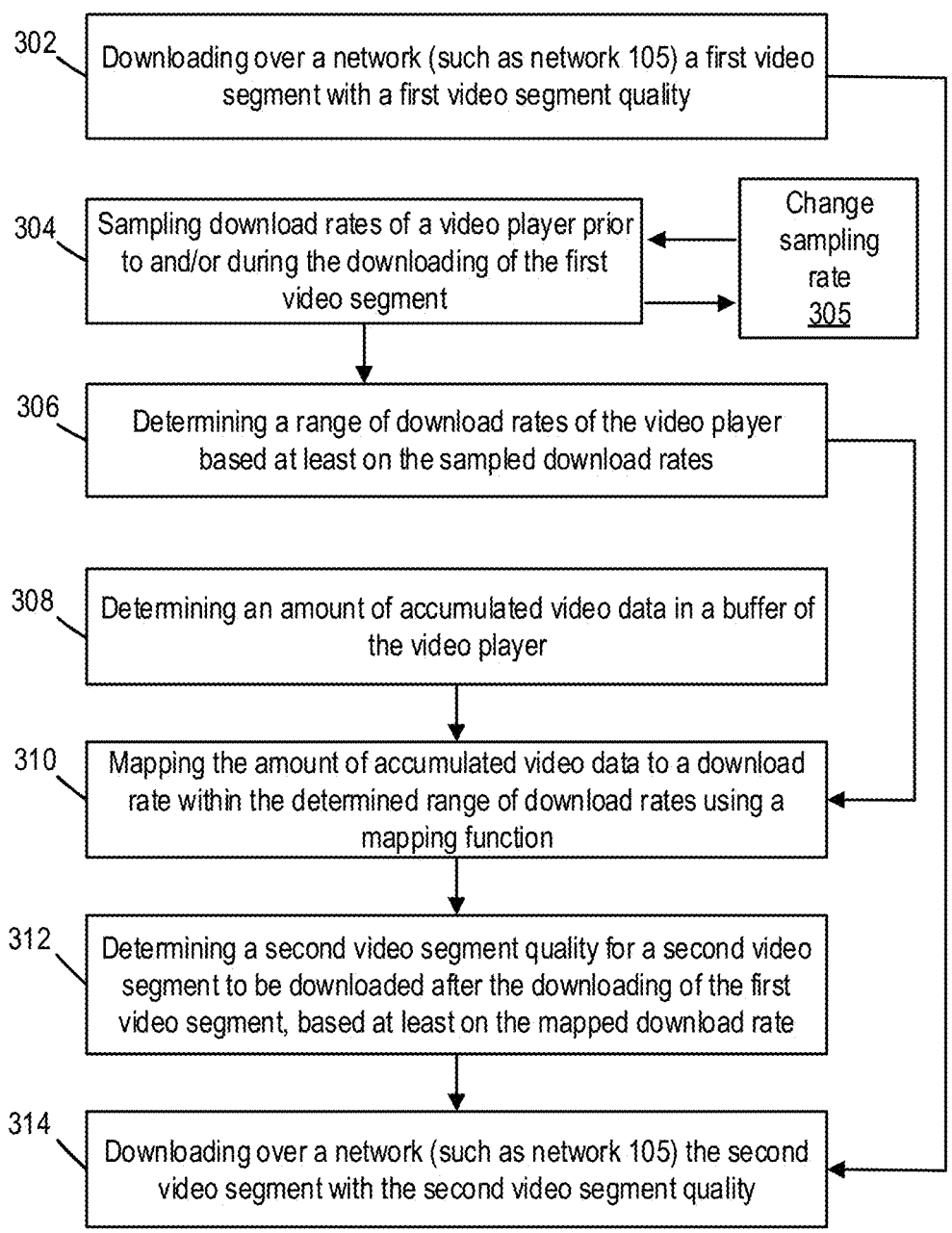
FIGS. 3-5 are flowcharts illustrating example methods, in accordance with some embodiments of the present disclosure.
Figure 4:
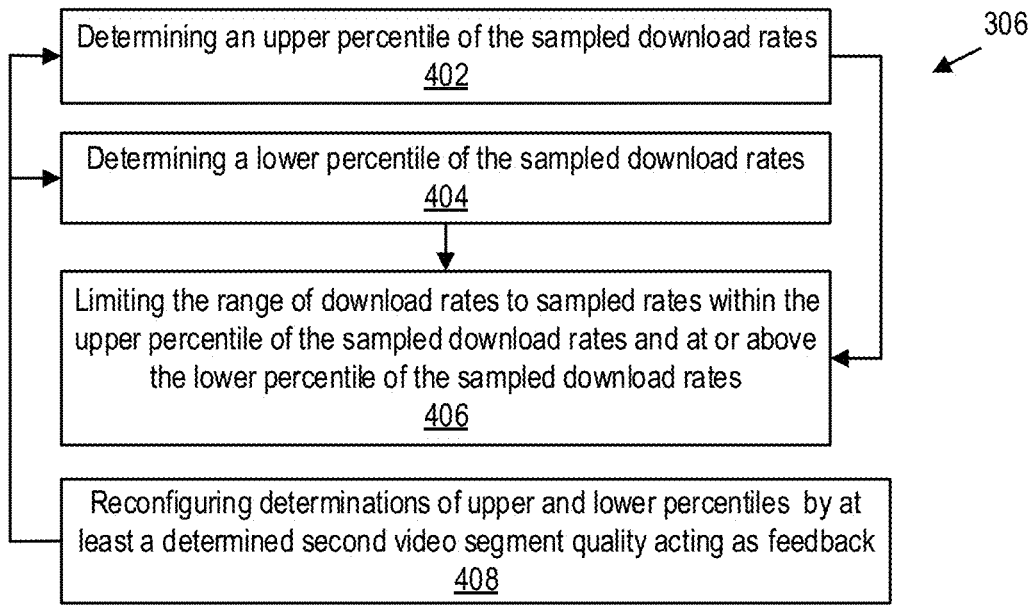
Figure 5:
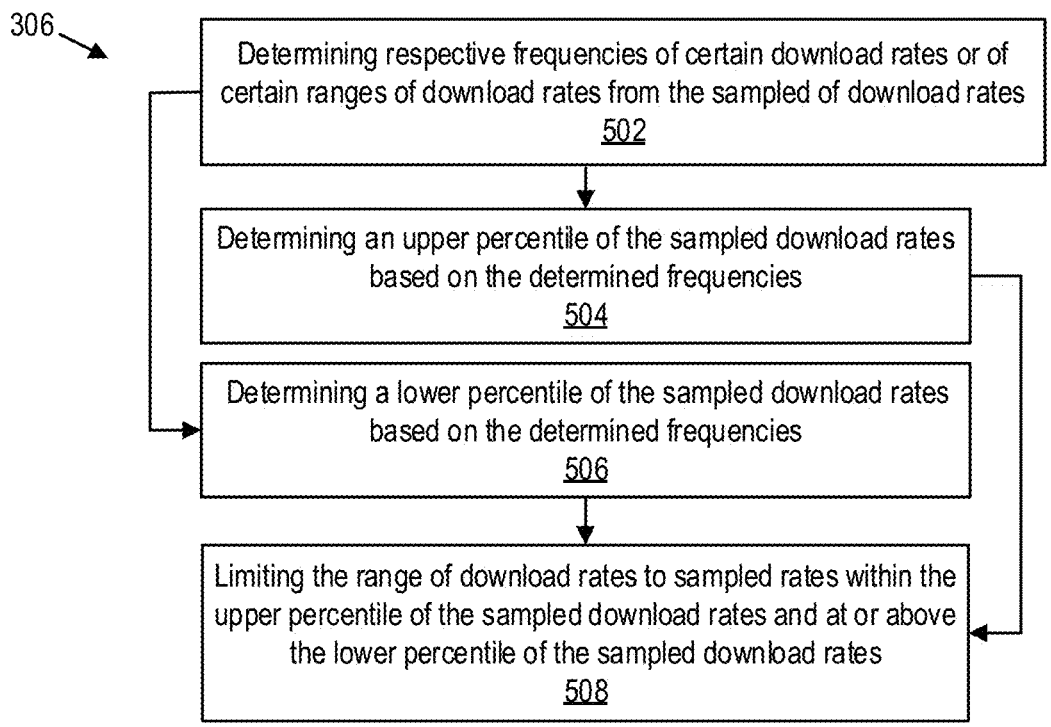

The mass memory also stores a system browser in RAM 232 for controlling operations of a system browser 243 and applications 242, such as enhanced video player 244 which can perform many of the operations described herein in relation to FIGS. 3-5.

The enhanced video player 244 can include, be a part of, or be a non-transitory computer-readable storage medium tangibly encoded with computer-executable instructions, that when executed by processing unit 222 of computing device 200, performs a method, the method including sampling download rates performed by the player 244, the device 200, another video player, or another device over a certain network (such as network 105). The sampling can occur prior to or during downloading and playing of a first video segment (e.g., a current video segment) by the enhanced video player 244. The first video segment has a first video segment quality. The method can also include determining a range of download rates based at least on the sampled download rates. The method can also include determining an amount of accumulated video data in a buffer of the enhanced video player 244 immediately prior to or during the downloading of the first video segment. The method can also include mapping the amount of accumulated video data to a download rate within the determined range of download rates using a mapping function (such as a linear or stepwise mapping function). The method can also include determining a second video segment quality for a second video segment (e.g., a next or another future video segment) to be downloaded to the enhanced video player 244 after the downloading of the first video segment based at least on the mapped download rate. After the determination of the second video segment quality, the enhanced video player 244 can download and play the second video segment using the second video segment quality.

Memory 230 further includes one or more data stores, which can be utilized by computing device 200 to store, among other things, the system browser 243, the applications 242 and/or other data. For example, data stores can be employed to store information that describes various capabilities of computing device 200. The information can then be provided to another device based on any of a variety of events, including being sent as part of a header during a communication, sent upon request, or the like. At least a portion of the capability information can also be stored on a disk drive or other storage medium (not shown) within computing device 200.

Applications 242 can include computer executable instructions which, when executed by computing device 200 or any of the other servers described herein, transmit, receive, and/or otherwise process text, audio, video, images, and enable telecommunication with other servers and/or another user of another client device. Examples of application programs or "apps" in some embodiments include browsers, calendars, contact managers, task managers, transcoders, photo management, database programs, word processing programs, security applications, spreadsheet programs, games, search programs, and so forth.

In some embodiments, the computing device 200 can include a processor and a non-transitory computer-readable storage medium for tangibly storing thereon program logic for execution by the processor, the program logic having: executable logic for sampling download rates of a video player prior to or during downloading of a first video segment to the video player, the first video segment having a first video segment quality; executable logic for determining a range of download rates of the video player based at least on the sampled download rates; executable logic for determining an amount of accumulated video data in a buffer of the video player immediately prior to or during the downloading of the first video segment; executable logic for mapping the amount of accumulated video data to a download rate within the determined range of download rates using a mapping function; and executable logic for determining a second video segment quality for a second video segment to be downloaded to the video player after the downloading of the first video segment, based at least on the mapped download rate.

Having described components of the architecture example employed within the disclosed systems and methods, the components' operations with respect to the disclosed systems and methods will now be described below with reference to FIGS. 3-5.

In FIG. 3, process 300 details steps performed by one or more computing devices (such as one or more of the computing devices described herein), in accordance with some embodiments of the present disclosure. Specifically, the steps of process 300 can be performed by a digital video player running on one or more computing devices (such as the enhanced video player 244). The steps are for selectively streaming video based on buffer data and download rates. Process 300 begins with step 302, which includes a digital video player, such as enhanced video player 244, or one or more other parts of one or more computing devices (such as devices 102-104 depicted in FIG. 1), downloading over a network (such as network 105) a first video segment (e.g., a current video segment) with a first video segment quality (e.g., a current video segment quality). The first video segment and other video segments described herein can be downloaded from one or more servers (such as from the video content server 106, the video service server 110, and/or the third server 114 depicted in FIG. 1).

In step 304, the video player (or one or more other parts of one or more computing devices) samples download rates of the video player prior to and/or during the downloading of the first video segment. In some embodiments, such as where sampling download rates of the video player occurs prior to the downloading of the first video segment, the process 300, at step 305, can further include changing sampling rate of the sampling of download rates of the video player during the downloading of the first video segment according to the sampled download rates sampled prior to the downloading of the first video segment. Step 305 can be performed by the video player or one or more other parts of one or more computing devices. The process 300 can further include changing sampling rate of the sampling of download rates of the video player during the downloading of the first video segment according to data associated with video downloads by the video player. The input data for changing sampling rate can be associated with video downloads that occur before or during the downloading of the first video segment.

In step 306, the video player (or one or more other parts of one or more computing devices) determines a range of download rates of the video player based at least on the sampled download rates. Step 306 can occur prior to, during, and/or after the downloading of the first video segment depending on when the sampling of step 304 occurs. In some embodiments, such as where the sampling download rates of the video player occur during and prior to the downloading of the first video segment, the determining the range of download rates can be based at least on the sampled download rates prior to and during the downloading of the first video segment.

As shown in FIG. 4, in some embodiments, the determining the range of download rates, at step 306, can further include determining an upper percentile of the sampled download rates, at step 402. The determining the range of download rates can further include determining a lower percentile of the sampled download rates, at step 404. The determining the range of download rates can further include limiting the range of download rates to sampled rates within the upper percentile of the sampled download rates and at or above the lower percentile of the sampled download rates, at step 406. The determinations of the upper and lower percentiles can be configurable based on data associated with video downloads over the network such as downloads by the video player. Also, determinations of the upper and lower percentiles can be configurable based on a user input into the video player.

Determinations of the upper and lower percentiles can also be reconfigurable at least according to a determined second video segment quality (e.g., a next or another future video segment quality) for a second video segment (e.g., a next or another future video segment) to be downloaded after the downloading of the first video segment. The determined second video segment quality can be feedback input for the reconfigurations of the percentiles, as shown in step 408. Also, the determinations of the upper and lower percentiles can be based on preselected upper and lower percentiles and/or corresponding weights.

As shown in FIG. 5, in some embodiments, the determining the range of download rates, at step 306, can further include determining respective frequencies of certain download rates or of certain ranges of download rates in the sampled download rates, at step 502. The determining the range of download rates can further include determining an upper percentile of the sampled download rates based on the determined frequencies, at step 504. The determining the range of download rates can also include determining a lower percentile of the sampled download rates based on the determined frequencies, at step 506. The determining the range of download rates can further include limiting the range of download rates to sampled rates within the upper percentile of the sampled download rates and at or above the lower percentile of the sampled download rates, at step 508.

In step 308, the video player (or one or more other parts of one or more computing devices) determines an amount of accumulated video data in a buffer of the video player. Step 308 can occur prior to, during, and/or after the downloading of the first video segment.

In step 310, the video player (or one or more other parts of one or more computing devices) maps the amount of accumulated video data to a download rate within the determined range of download rates using a mapping function (such as a linear mapping function or a stepwise mapping function). FIGS. 6-9 illustrate examples of the mapping using a linear mapping function. Step 310 can occur prior to, during, and/or after the downloading of the first video segment; however, step 310 occurs after steps 306 and 308 since steps 306 and 308 provide the input for the mapping of step 310.

Figure 6:
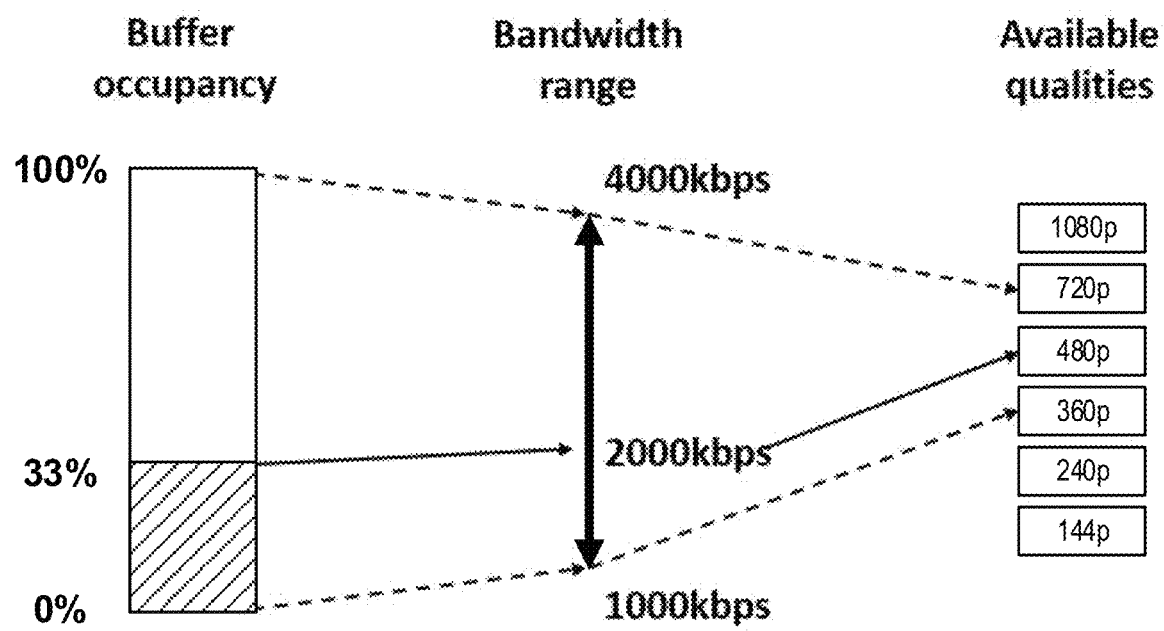
FIGS. 6-9 are schematic diagrams illustrating example operations in accordance with some specific implementations of some embodiments of the present disclosure.

In step 312, the video player (or one or more other parts of one or more computing devices) determines a second video segment quality (e.g., a next or another future video segment quality) for a second video segment (e.g., a next or another future video segment) to be downloaded after the downloading of the first video segment, based at least on the mapped download rate. FIG. 6 illustrates an example of the determining of the second video segment quality according to the example mapping shown in FIG. 7, which is shown using a linear mapping function. The determination of the second video segment quality for the second video segment to be downloaded after the downloading of the first video segment can also be based at least on video segment qualities available to the video player. For example, the video player can retrieve the video segment qualities available through an interface with the display displaying the video, and then further determine the second video segment quality based at least on video segment qualities available to the video player through the display. The interface with the display can be or be included in a graphics or video rendering application of the display.

Also, the video player (or one or more other parts of one or more computing devices) can determine the second video segment quality further based on data size of the second video segment. For example, the second video segment quality can be determined based on the second video segment being a number of bytes exceeding one or more thresholds that map to different second video segment qualities.

Example video segment qualities can include 1080p, 720p, 480p, 360p, 240p, and 144p. Example video segment qualities can also include any television resolution, such as 480i, 576i, 480p, 576p, HD, Full HDi, Full HD, 4K UHD, DCI 4K, 8K UHD. Also, example video segment qualities can include any computer display resolution, such as 1080p, 720p, 1024×768 extended graphics array pixel resolution, 1280×1024 pixel resolution, 800×600 resolution, UXGA (1600×1200 resolution), QXGA (2048×1536 resolution), SXGA+ (1400×1050 resolution), WXGA (1280×800 resolution), WSXGA+ (1680×1050 resolution), WUXGA (1920×1200 resolution), 1366×768 resolution, 2560×1440 resolution, 2880×1800 resolution, and 4096×2160 pixel resolution.

In step 314, the video player (or one or more other parts of one or more computing devices) downloads the second video segment with the second video segment quality. In step 314, the video player (or one or more other parts of one or more computing devices) downloads the second video segment from a source over the network. The second video segment and other video segments described herein can be downloaded from one or more servers (such as from the video content server 106, the video service server 110, and/or the third server 114 depicted in FIG. 1) via a network (such as network 105). Alternatively, the video segments can be downloaded through a peer-to-peer network, and the range of download rates can be determined analogously for the peer-to-peer network.

FIGS. 6-9 are schematic diagrams illustrating example operations in accordance with some embodiments of the present disclosure. Specifically, FIG. 6 shows a depiction of a specific example of a specific instance of the process 300 being used to choose the second video segment quality from available qualities according to a determination of buffer occupancy and mapping from the determined buffer occupancy to a determined bandwidth range (the mapping depicted by the left pair of dashed arrows and the one left solid arrow). The determination and choosing of the second video segment quality in FIG. 6 uses an additional mapping function. And, as shown by FIG. 6, the mapping functions used are linear mapping functions. In summary, FIG. 6 shows the mapping of the determined buffer occupancy to the determined bitrate download range as well as the choosing of the second video segment quality based on the mapping results of the mapping from the determined buffer occupancy to the determined bandwidth range, and then it shows mapping from the bandwidth range to the available video segment qualities.

Figure 7:
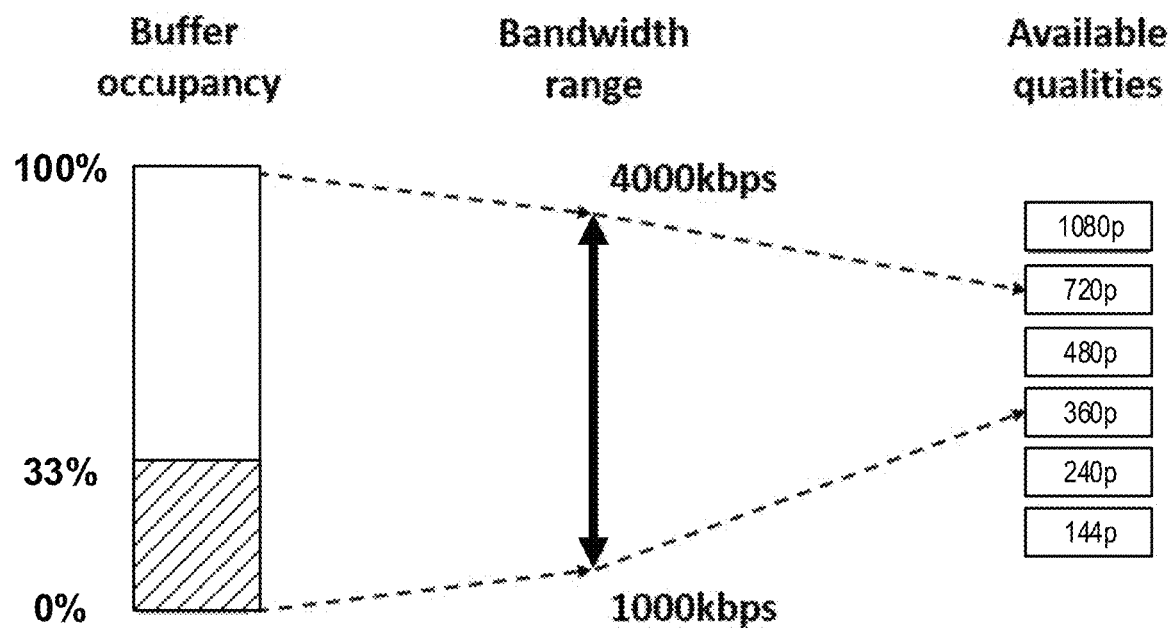

FIG. 7 specifically shows an example of how mapping to a range provides a better representation of an actual network's bandwidth which is shown as at least fluctuating from 1000 kbps to 4000 kbps.

Figure 8:
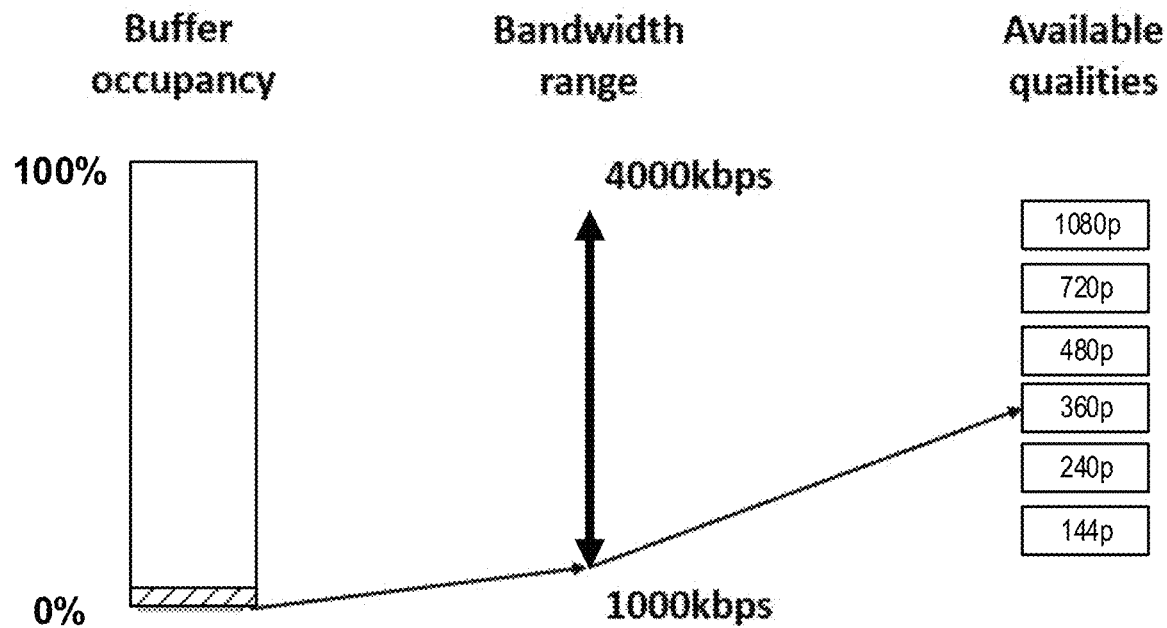

FIG. 8 specifically shows an example of how the techniques described herein prevent a determination of an empty or near empty buffer from causing drops in quality to the lowest quality available. This occurs because the mapping with the bandwidth range directs the mapping to a higher quality. This prevents unnecessary quality degradation.

Figure 9:
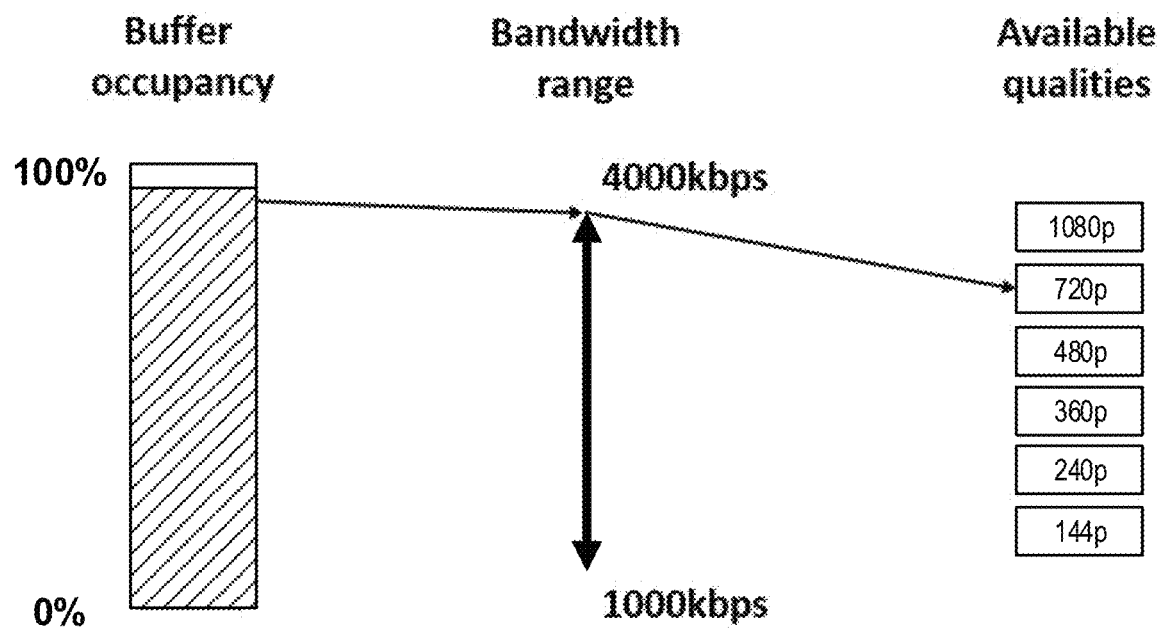

FIG. 9 specifically shows an example of how the techniques described herein prevent a determination of a full or almost full buffer from causing an over increase in the video quality to the highest quality available. This occurs because the mapping with the bandwidth range directs the mapping to a slightly lower quality. This prevents unnecessary buffer draining and future unnecessary rebuffering issues and delays.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module can be stored on a computer readable medium for execution by a processor. Modules can be integral to one or more servers, or be loaded and executed by one or more servers. One or more modules can be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either the client level or server level or both. In this regard, any number of the features of the different embodiments described herein can be combined into single or multiple embodiments, and alternate embodiments having fewer than, or more than, all of the features described herein are possible.

Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications can be made to the elements and operations described above to obtain a result that remains within the scope of the systems and processes described in this disclosure.

What is claimed is:

1. A method comprising:
   identifying, via a computing device, a plurality of download rates of a video player;
   determining, via the computing device, using the plurality of identified download rates of the video player, a range of download rates at which content has been downloaded by video player; and
   determining, via the computing device, a quality level for a video segment for download for the video player, the determining comprising:
      determining an amount of accumulated video data in a buffer of the video player;
      identifying a download rate in the range of download rates using a first mapping that maps a buffer state to the range of download rates, the determined amount of accumulated video data representing the buffer state is mapped to the identified download rate by the first mapping; and
      identifying the quality level for the video segment using a second mapping that maps the range of download rates to video segment quality levels, the identified download rate being mapped to the identified video segment quality level by the second mapping.

2. The method of claim 1, further comprising:
   identifying, via the computing device, a second plurality of download rates of the video player in connection with the video segment;
   using, via the computing device, the second plurality of download rates to determine an updated range of download rates; and
   determining the quality level for a second video segment using the updated range of download rates and the first and second mappings.

3. The method of claim 1, determining the range of download rates further comprising:
   determining upper and lower percentiles in connection with the identified plurality of download rates; and
   determining the range of download rates based on the determined upper and lower percentiles and the plurality of identified download rates.

4. The method of claim 3, wherein the range of download rates is representative of the identified download rates, of the plurality of identified download rates, within the determined upper and lower percentiles.

5. The method of claim 3, wherein the upper and lower percentiles are user configurable.

6. The method of claim 3, wherein the upper and lower percentiles are configurable using data reflecting video downloads over a computer network used to download video data to the video player.

7. The method of claim 3, wherein the determined upper and lower percentiles are preselected upper and lower percentiles.

8. The method of claim 3, determining the upper and lower percentiles further comprises:

determining respective frequencies of certain download rates or of certain ranges of download rates in the plurality of identified download rates; and determining the upper percentile and lower percentiles using the determined frequencies.

9. The method of claim 1, identifying the video segment's quality level is further based on a data size of the video segment.

10. The method of claim 1, wherein the first and second mappings each comprise a mapping function.

11. The method of claim 10, the mapping function is a linear mapping function.

12. The method of claim 1, wherein the amount of accumulated video rate is indicative of a low-buffer state that maps to a lowest download rate in the range of download rates via the first mapping, and the second mapping addresses possible degradations in quality by mapping the lowest download rate, in the range of download rates, to a video segment quality level higher than a lowest video segment quality level.

13. The method of claim 1, wherein the amount of accumulated video rate is indicative of a full-buffer state that maps to a highest download rate in the range of download rates via the first mapping, and the second mapping addresses possible buffer drainage by mapping the highest download rate, in the range of download rates, to a video segment quality level lower than a highest video segment quality level.

14. A non-transitory computer-readable storage medium tangibly encoded with computer-executable instructions, that when executed by a processor of a computing device, performs a method, the method comprising:

identifying a plurality of download rates of a video player;

determining, using the plurality of identified download rates of the video player, a range of download rates at which content has been downloaded by video player; and determining a quality level for a video segment for download for the video player, the determining comprising:

determining an amount of accumulated video data in a buffer of the video player;

identifying a download rate in the range of download rates using a first mapping that maps a buffer state to the range of download rates, the determined amount of accumulated video data representing the buffer state is mapped to the identified download rate by the first mapping; and identifying the quality level for the video segment using a second mapping that maps the range of download rates to video segment quality levels, the identified download rate being mapped to the identified video segment quality level by the second mapping.

15. The non-transitory computer-readable storage medium of claim 14, the method further comprising:

identifying a second plurality of download rates of the video player in connection with the video segment;

using the second plurality of download rates to determine an updated range of download rates; and determining the quality for a second video segment using the updated range of download rates and the first and second mappings.

16. The non-transitory computer-readable storage medium of claim 14, determining the range of download rates further comprising:

determining upper and lower percentiles in connection with the identified plurality of download rates; and determining the range of download rates based on the determined upper and lower percentiles and the plurality of identified download rates.

17. The non-transitory computer-readable storage medium of claim 16, determining the upper and lower percentiles further comprises:

determining respective frequencies of certain download rates or of certain ranges of download rates in the plurality of identified download rates; and determining the upper percentile and lower percentiles using the determined frequencies.

18. The non-transitory computer-readable storage medium of claim 14, wherein the amount of accumulated video rate is indicative of a low-buffer state that maps to a lowest download rate in the range of download rates via the first mapping, and the second mapping addresses possible degradations in quality by mapping the lowest download rate, in the range of download rates, to a video segment quality level higher than a lowest video segment quality level.

19. The non-transitory computer-readable storage medium of claim 14, wherein the amount of accumulated video rate is indicative of a full-buffer state that maps to a highest download rate in the range of download rates via the first mapping, and the second mapping addresses possible buffer drainage by mapping the highest download rate, in the range of download rates, to a video segment quality level lower than a highest video segment quality level.

20. A computing device, comprising:

a processor; and a non-transitory computer-readable storage medium for tangibly storing thereon program logic for execution by the processor, the program logic comprising:

executable logic for identifying a plurality of download rates of a video player;

executable logic for determining, using the plurality of identified download rates of the video player, a range of download rates at which content has been downloaded by video player; and executable logic for determining a quality level for a video segment for download for the video player, the executable logic for determining comprising:

executable logic for determining an amount of accumulated video data in a buffer of the video player;

executable logic for identifying a download rate in the range of download rates using a first mapping that maps a buffer state to the range of download rates, the determined amount of accumulated video data representing the buffer state is mapped to the identified download rate by the first mapping; and executable logic for identifying the quality level for the video segment using a second mapping that maps the range of download rates to video segment quality levels, the identified download rate being mapped to the identified video segment quality level by the second mapping.

\* \* \* \* \*